US012563625B2

(12) United States Patent　(10) Patent No.: US 12,563,625 B2
Hahn　(45) Date of Patent: Feb. 24, 2026

(54) METHOD AND DEVICE FOR LINK RECOVERY IN SIDELINK RELAY COMMUNICATION

(71) Applicants: HYUNDAI MOTOR COMPANY, Seoul (KR); KIA CORPORATION, Seoul (KR)

(72) Inventor: Gene Back Hahn, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 348 days.

(21) Appl. No.: 18/140,411

(22) Filed: Apr. 27, 2023

(65) Prior Publication Data

US 2023/0269812 A1　Aug. 24, 2023

Related U.S. Application Data

(63) Continuation-in-part of application No. PCT/KR2021/015336, filed on Oct. 28, 2021.

(Continued)

(30) Foreign Application Priority Data

Oct. 28, 2021　(KR) ........................ 10-2021-0145150

(51) Int. Cl.
*H04W 76/19* (2018.01)
*H04L 1/1812* (2023.01)
*H04W 8/00* (2009.01)

(52) U.S. Cl.
CPC ........... *H04W 76/19* (2018.02); *H04L 1/1812* (2013.01); *H04W 8/005* (2013.01)

(58) Field of Classification Search
CPC ..... H04W 76/19; H04W 8/005; H04W 88/04; H04W 76/23; H04W 76/14; H04W 92/18;
(Continued)

(56) References Cited

U.S. PATENT DOCUMENTS 10,412,571 B2　9/2019　Baghel et al.
10,602,550 B2　3/2020　Burbidge et al.
(Continued)

FOREIGN PATENT DOCUMENTS

CN　107431912 A　12/2017
KR　10-2017-0129917 A　11/2017
(Continued)

OTHER PUBLICATIONS

LG Electronics Inc., "PC5 link failure handling for NR sidelink relay," 3GPP TSG-RAN WG2 Meeting of #112e, Online Meeting, Nov. 2-13, 2020 (R2-2010652).

*Primary Examiner* — Nimesh Patel
(74) *Attorney, Agent, or Firm* — Morgan Lewis & Bockius LLP

(57) ABSTRACT

In a method and a device for link recovery in a sidelink relay communication, an operating method of a transmission terminal includes: performing a first SL relay communication with a reception terminal through a first relay terminal; when a preconfigured condition is satisfied, declaring an RLF for a sidelink in which the first SL relay communication is performed; establishing a connection with a second relay terminal; and performing a second SL relay communication with the reception terminal through the second relay terminal.

10 Claims, 11 Drawing Sheets

Related U.S. Application Data

(60) Provisional application No. 63/107,135, filed on Oct. 29, 2020.

(58) Field of Classification Search
CPC ............. H04W 72/02; H04W 52/0229; H04W 52/0245; H04W 72/54; H04W 28/0268; H04W 72/20; H04W 28/0236; H04W 28/0967; H04W 48/10; H04W 84/042; H04W 4/023; H04W 72/04; H04W 36/302; H04W 56/002; H04W 72/563; H04W 76/10; H04W 36/18; H04W 36/00833; H04W 36/144; H04W 36/03; H04W 72/00; H04W 88/14; H04W 72/23; H04W 72/0446; H04W 72/1268; H04W 72/21; H04W 48/16; H04W 72/542; H04W 60/04; H04W 8/24; H04W 72/25; H04W 36/00698; H04W 36/0094; H04W 72/543; H04W 92/02; H04W 92/16; H04W 72/535; H04W 16/18; H04W 68/12; H04W 48/12; H04W 40/12; H04W 40/22; H04W 40/24; H04L 1/1812; H04L 2001/0097; H04L 5/0007; H04L 41/0803; H04L 43/08; H04L 5/006; H04L 5/0037; H04L 5/0053; H04L 5/0048; H04L 5/0023; H04L 5/0055; H04L 5/0098; H04L 27/261; H04L 1/0026; H04L 41/0894; H04J 11/0079; H04J 11/0056; H04J 11/0026; H04J 11/00; H04J 11/0059; H04J 11/0069; H04J 11/0023; H04J 2011/0096; H04J 11/0036; H04J 11/0053; H04J 11/005; H04J 13/004; H04J 13/18; H04B 7/0695; H04B 7/0452; H04B 7/0626; H04B 7/0617; H04B 17/318; H04B 17/336; H04B 7/06954; H04B 17/327; H04B 7/15507; H04B 17/382; H04B 17/346; H04B 17/328; H04B 17/3913; H04B 7/088; H04B 17/345; H04B 7/0632; H04B 7/24; Y02D 30/70; G06N 20/00; G06N 3/063
See application file for complete search history.

(56) References Cited

U.S. PATENT DOCUMENTS

| | | | |
|---|---|---|---|
| 10,849,037 B2 | 11/2020 | Feng | |
| 2016/0286374 A1* | 9/2016 | Baghel | H04W 24/10 |
| 2018/0027429 A1 | 1/2018 | Li et al. | |
| 2018/0352412 A1* | 12/2018 | Huang | H04W 36/0055 |
| 2020/0296619 A1* | 9/2020 | Pan | H04W 76/14 |
| 2022/0124573 A1* | 4/2022 | Tsai | H04W 36/0079 |
| 2022/0132614 A1* | 4/2022 | Back | H04W 76/19 |
| 2022/0287128 A1* | 9/2022 | Shin | H04W 8/005 |

FOREIGN PATENT DOCUMENTS

| | | | |
|---|---|---|---|
| KR | 10-2018-0034524 A | 4/2018 |
| KR | 10-2018-0125455 A | 11/2018 |
| WO | 2020/164613 A1 | 8/2020 |
| WO | 2020/167773 A1 | 8/2020 |

* cited by examiner

MEMORY

| ROM | RAM |

PROCESSOR

INPUT
INTERFACE
DEVICE — 340

OUTPUT
INTERFACE
DEVICE — 350

370

STORAGE
DEVICE — 360

TRANSCEIVER — 330

235

236

| UE #5 |
| PDCP |
| RLC |
| MAC |
| PHY |

| UE #6 |
| PDCP |
| RLC |
| MAC |
| PHY |

PC5-U INTERFACE

Figures 5, 6:
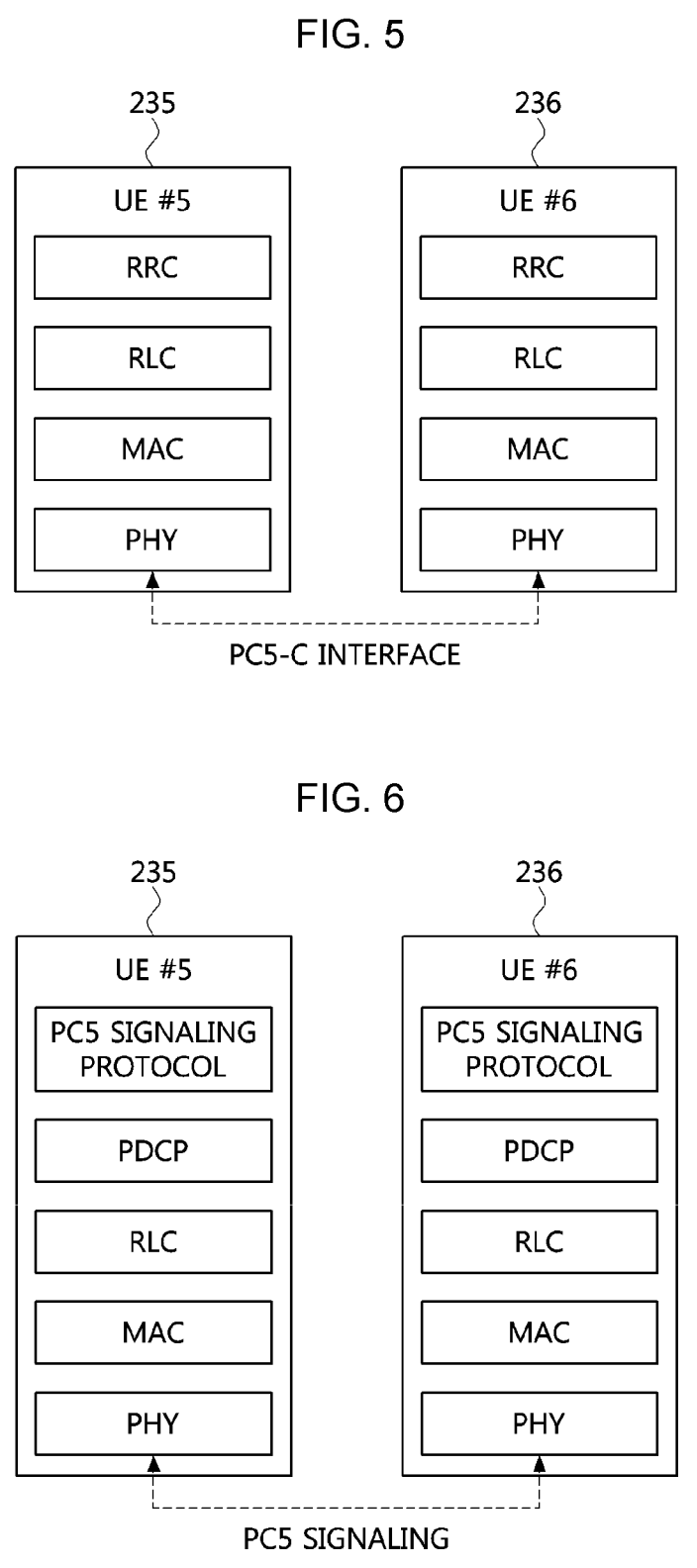

RRC

RLC

MAC

PHY

UE #6

RRC

RLC

MAC

PHY

PC5-C INTERFACE

PC5 SIGNALING PROTOCOL

PDCP

RLC

MAC

PHY

UE #6

PC5 SIGNALING PROTOCOL

PDCP

RLC

MAC

PHY

PC5 SIGNALING

METHOD AND DEVICE FOR LINK RECOVERY IN SIDELINK RELAY COMMUNICATION

CROSS-REFERENCE OF RELATED APPLICATIONS

The present application is a continuation-in-part of International Patent Application No. PCT/KR2021/015336, filed Oct. 28, 2021, which claims priority to Korean Patent Application Number 10-2021-0145150, filed Oct. 28, 2021, and U.S. Provisional Patent Application No. 63/107,135, filed Oct. 29, 2020, the entire contents of which are incorporated herein for all purposes by these references

BACKGROUND OF THE PRESENT DISCLOSURE

Field of the Present Disclosure

The present disclosure relates to a sidelink (SL) communication technique, and more particularly, to a technique for recovering a radio link failure (RLF) in SL relay communication.

Description of Related Art

A Fifth-Generation (5G) communication system (e.g., New Radio (NR) communication system) which utilizes a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels. Sidelink communication may be performed using configured grant (CG) resources. The CG resources may be periodically configured, and periodic data (e.g., periodic sidelink data) may be transmitted using the CG resources.

Meanwhile, SL communication between a transmitting terminal and a receiving terminal may be performed in a relay manner. Relay communication performed through sidelinks may be referred to as SL relay communication. For the SL relay communication, a connection between the transmitting terminal and a relay terminal may be configured, and a connection between the relay terminal and the receiving terminal may be configured. The relay terminal may relay SL communication between the transmitting terminal and the receiving terminal. A radio link failure (RLF) may occur in a link between the transmitting terminal and the relay terminal and/or a link between the receiving terminal and the relay terminal. In the instant case, methods for recovering the RLF are needed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for recovering an RLF in SL relay communication.

An operation method of a transmitting terminal, according to various exemplary embodiments of the present disclosure for achieving the above-described objective, may include: performing first sidelink (SL) relay communication with a receiving terminal through a first relay terminal: declaring a radio link failure (RLF) for a sidelink where the first SL relay communication is performed when a preconfigured condition is satisfied; configuring a connection with a second relay terminal; and performing second SL relay communication with the receiving terminal through the second relay terminal.

The preconfigured condition may be a case in which a number of reception failures of hybrid automatic repeat request (HARQ)-acknowledgement (ACK) for data transmitted through the first relay terminal is greater than or equal to a threshold value.

The preconfigured condition may be a case in which data transmitted by the transmitting terminal is not received by the first relay terminal within a preset time.

The operation method may further include receiving, from a base station, a first message including information indicating the preconfigured condition used for declaring the RLF.

The first message may further include information used to determine whether the preconfigured condition is satisfied.

The preconfigured condition may be independently configured for each terminal type, and the terminal type may indicate a transmitting terminal, a relay terminal, or a receiving terminal.

The configuring of the connection with the second relay terminal may include: transmitting a discovery message in a broadcast scheme; and configuring a connection with the second relay terminal determined based on the discovery message.

The operation method may further include transmitting, to the receiving terminal, information of the second relay terminal connected to the transmitting terminal through the second relay terminal.

An operation method of a relay terminal, according to various exemplary embodiments of the present disclosure for achieving the above-described objective, may include: performing sidelink (SL) relay communication between a transmitting terminal and a receiving terminal: determining that a radio link failure (RLF) for a sidelink where the first SL relay communication is performed has occurred when a preconfigured condition is satisfied; and transmitting a second message indicating the occurrence of the RLF.

The operation method may further include receiving, from a base station, a first message including information indicating the preconfigured condition used for declaring the RLF, wherein the first message further includes information to be used for determining whether the preconfigured condition is satisfied.

The preconfigured condition may be a case in which a number of reception failures of hybrid automatic repeat request (HARQ)-acknowledgement (ACK) for data of the transmitting terminal transmitted from the relay terminal to the receiving terminal is greater than or equal to a threshold value, and when the preconfigured condition is satisfied, the second message may be transmitted to the transmitting terminal.

The preconfigured condition may be a case in which data transmitted by the transmitting terminal is not received within a preset time, and when the preconfigured condition is satisfied, the second message may be transmitted to the receiving terminal.

The preconfigured condition may be independently configured for each terminal type, and the terminal type may indicate a transmitting terminal, a relay terminal, or a receiving terminal.

The second message may further include information of a sidelink in which the RLF has occurred.

An operation method of a receiving terminal, according to various exemplary embodiments of the present disclosure for achieving the above-described objective, may include: receiving radio link failure (RLF) configuration information from a base station; performing first sidelink (SL) relay communication with a transmitting terminal through a first relay terminal: declaring an RLF for a sidelink where the first SL relay communication is performed when a condition indicated by the RLF configuration information is satisfied: configuring a connection with a second relay terminal; and performing second SL relay communication with the transmitting terminal through the second relay terminal.

The condition may be a case in which data of the transmitting terminal is not received from the first relay terminal within a preset time, and information of the preset time may be included in the RLF configuration information.

The condition may be a case in which the first relay terminal does not receive data from the transmitting terminal within a preset time, and information of the preset time may be included in the RLF configuration information.

The configuring of the connection with the second relay terminal may include: transmitting a discovery message in a broadcast scheme; and configuring a connection with the second relay terminal determined based on the discovery message.

The operation method may further include transmitting information of the second relay terminal connected to the receiving terminal to the transmitting terminal through the second relay terminal.

The RLF configuration information may be common RLF configuration information for the transmitting terminal, the first relay terminal, the second relay terminal, and the receiving terminal or individual RLF configuration information for the receiving terminal.

According to an exemplary embodiment of the present disclosure, when data is not received in an SL or when hybrid automatic request repeat (HARQ)-acknowledgement (ACK) for data is not received in an SL, a transmitting terminal and/or a receiving terminal may declare a radio link failure (RLF) and may discover a new relay terminal. The transmitting terminal and/or the receiving terminal may configure a connection with the new relay terminal and perform SL relay communication through the new relay terminal. Accordingly, SL communication may be performed efficiently.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a conceptual diagram illustrating V2X communication scenarios.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

Figure 2:
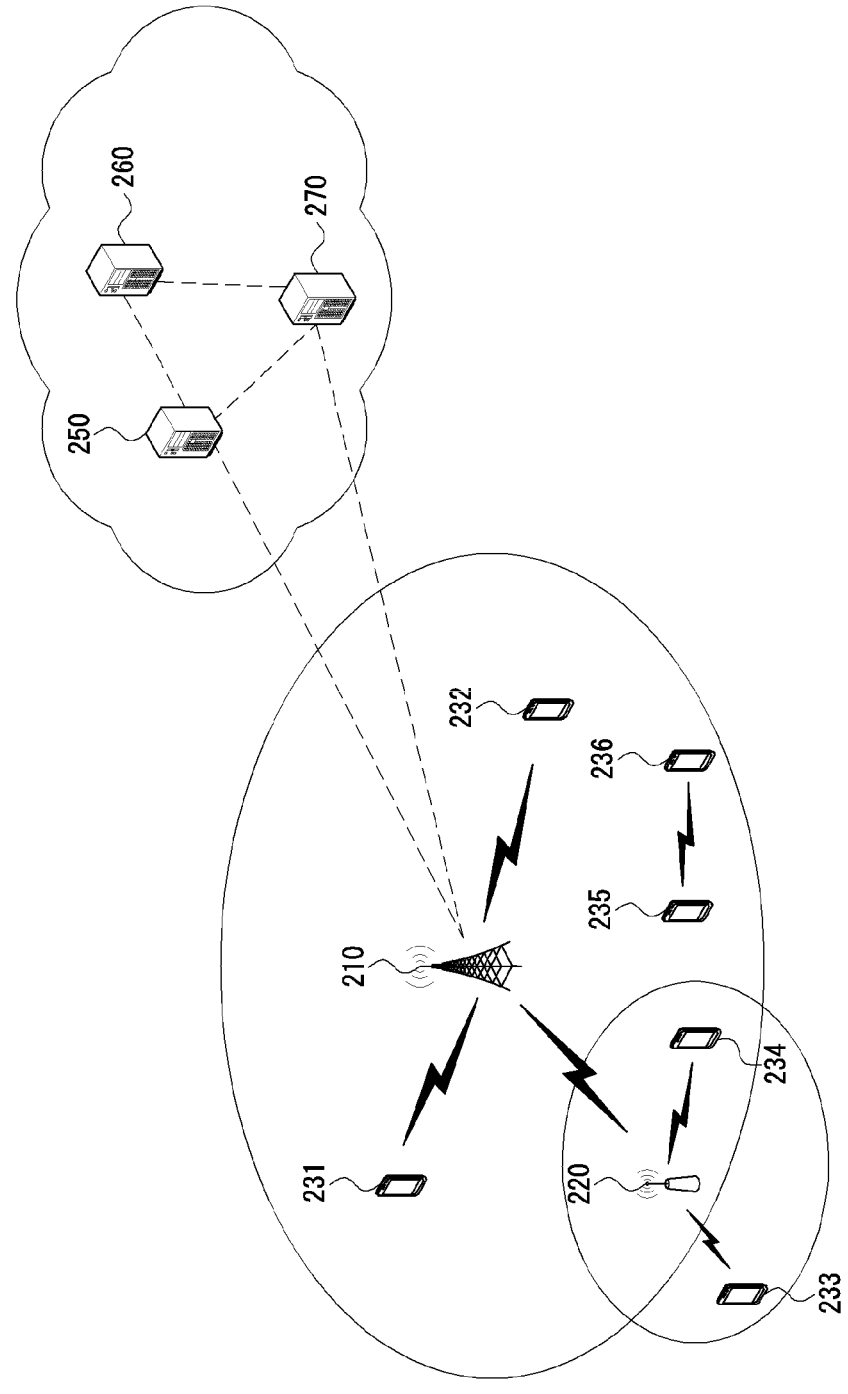
FIG. 2 is a conceptual diagram illustrating an exemplary embodiment of a cellular communication system.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the other hand, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". Furthermore, "one or more of A and B" may refer to "one or more of A or B" or "one or more of combinations of one or more of A and B".

In exemplary embodiments of the present disclosure, (re) transmission may mean 'transmission', 'retransmission', or 'transmission and retransmission', (re) configuration may mean 'configuration', 'reconfiguration', or 'configuration and reconfiguration', (re) connection may mean 'connection', 'reconnection', or 'connection and reconnection', and (re) access may mean 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in an exemplary embodiment of the present disclosure are only used to describe specific exemplary embodiments of the present disclosure, and are not intended to limit the present disclosure. The singular expression includes the plural expression unless the context clearly dictates otherwise. In an exemplary embodiment of the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which the present disclosure belongs. Terms that are generally used and have been in dictionaries should be construed as having meanings matched with contextual meanings in the art. In the present description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

Figure 1:
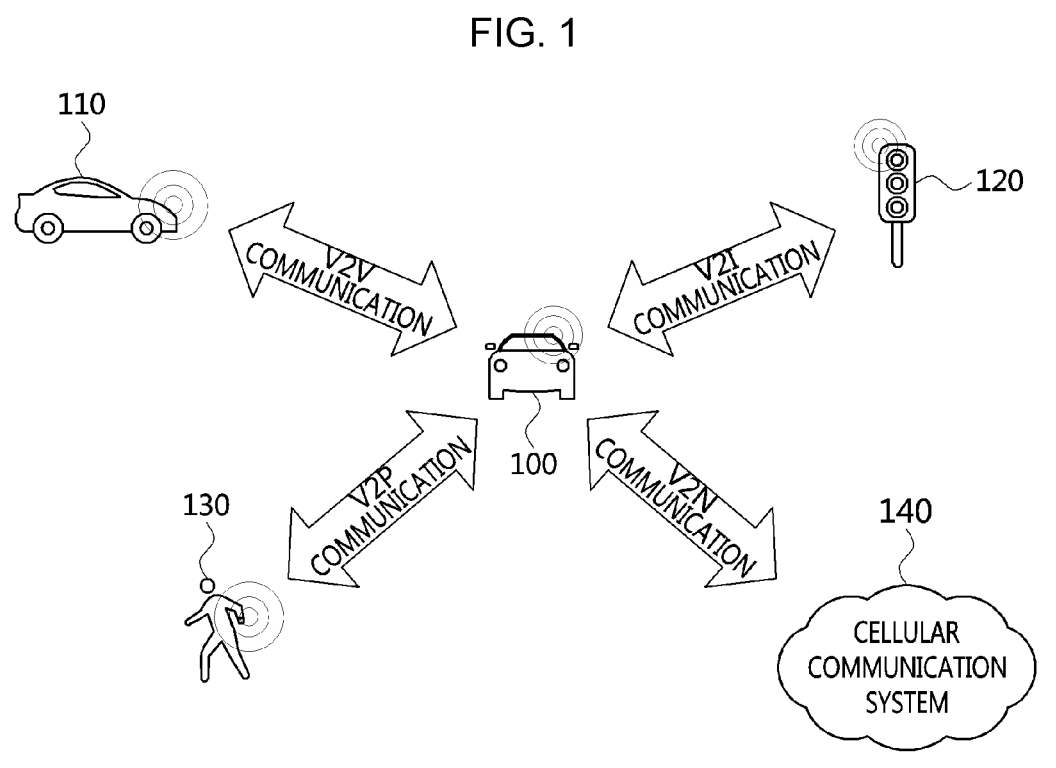

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In the instant case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may be configured to generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Furthermore, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by use of at least one communication technology among a Code Division Multiple Access (CDMA) technology, a Time Division Multiple Access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figures 3, 4:
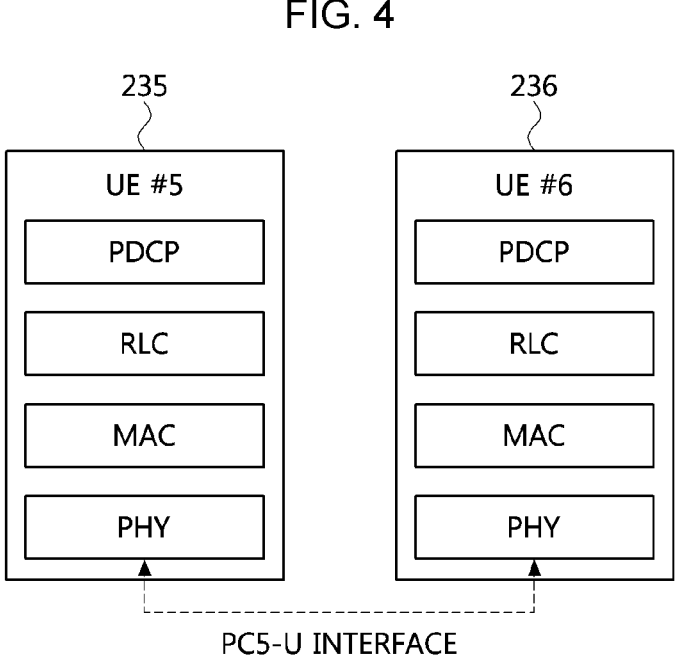
FIG. 3 is a conceptual diagram illustrating an exemplary embodiment of a communication node forming a cellular communication system.
FIG. 4 is a block diagram illustrating an exemplary embodiment of a user plane protocol stack of a UE performing sidelink communication.

FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. Furthermore, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, a transmitting terminal may perform SL communication with a receiving terminal. The SL communication between the transmitting terminal and the receiving terminal may be performed in a unicast scheme. The transmitting terminal may refer to a terminal that transmits data (e.g., SL data) through a sidelink. That is, the transmitting terminal may refer to a source terminal. The receiving terminal may refer to a terminal that receives the SL data through the sidelink. That is, the receiving terminal may refer to a destination terminal. When relay communication (e.g., SL relay communication) is required during the SL communication between the transmitting terminal and the receiving terminal, a connection between the transmitting terminal and a relay terminal may be configured, and a connection between the receiving terminal and the relay terminal may be configured. When the above connection configuration is completed, SL relay communication may be performed.

During the SL relay communication, a link quality between the transmitting terminal and the relay terminal and/or a link quality between the receiving terminal and the relay terminal may deteriorate, and in the instant case, the SL relay communication may not be successfully performed. As a distance between communication nodes increases, a link quality between the communication nodes may deteriorate. The above situation may cause a radio link failure (RLF). An RLF in a sidelink may be referred to as 'SL RLF'. In SL relay communication, an RLF declaration method (e.g., detection method) and an RLF recovery method are required.

In SL relay communication, when one or more conditions defined in Table 3 below are satisfied, a communication node (e.g., transmitting terminal, relay terminal, and/or receiving terminal) may declare (or detect) an RLF.

TABLE 3

|  | Description |
|---|---|
| Condition #1 | When a receiving terminal does not receive data (e.g., data of a transmitting terminal) from a relay terminal within a preset time, the receiving terminal may declare an RLF. |
| Condition #2 | A relay terminal may not receive an HARQ-ACK for data transmitted to a receiving terminal. When the number of reception failures of the HARQ-ACK (e.g., the number of DTX occurrences) for the data transmitted to the receiving terminal is equal to or greater than a preset number of times (e.g., threshold), the relay terminal may inform the situation to a transmitting terminal, and the transmitting terminal may declare an RLF. |
| Condition #3 | A relay terminal transmits data to a receiving terminal, receives an HARQ-ACK for the data from the receiving terminal, and delivers the received HARQ-ACK to a transmitting terminal. In the present situation, the transmitting terminal may not receive the HARQ-ACK of the receiving terminal from the relay terminal. When the number of reception failures of the HARQ-ACK (e.g., the number of DTX occurrences) from the receiving terminal is equal to or greater than a preset number of times (e.g., threshold), the transmitting terminal may declare an RLF. |
| Condition #4 | A transmitting terminal transmits data to a relay terminal, and perform a reception operation for an HARQ-ACK for the data. In the present situation, the transmitting terminal may not receive the HARQ-ACK for the data transmitted to the relay terminal. When the number of reception failures of the HARQ-ACK (e.g., the number of DTX occurrences) for the data that the transmitting terminal transmits to the relay terminal is equal to or greater than a preset number of times (e.g., threshold), the transmitting terminal may declare an RLF. |
| Condition #5 | When a relay terminal does not receive data (e.g., data of a transmitting terminal) from the transmitting terminal within a preset time, the relay terminal may inform the situation to the receiving terminal, and the receiving terminal may declare an RLF. |

Among the conditions defined in Table 3, an RLF declaration subject, a link in which an RLF has occurred, and parameters required for declaration of an RLF may be as shown in Table 4 below.

TABLE 4

| | RLF declaration subject | RLF occurred link | RLF parameters |
|---|---|---|---|
| Condition #1 | Transmitting terminal | A link between a receiving terminal and a relay terminal, and/or a link between a transmitting terminal and the relay terminal | Preset time which is a comparison reference for a time during which data is not received |
| Condition #2 | Transmitting terminal and/or relay terminal | A link between a receiving terminal and a relay terminal | Preset number of times which is a comparison reference for the number of HARQ-ACK reception failure |
| Condition #3 | Transmitting terminal | A link between a receiving terminal and a relay terminal, and/or a link between a transmitting terminal and the relay terminal | Preset number of times which is a comparison reference for the number of HARQ-ACK reception failure |
| Condition #4 | Transmitting terminal | A link between a transmitting terminal and a relay terminal | Preset number of times which is a comparison reference for the number of HARQ-ACK reception failure |
| Condition #5 | Receiving terminal and/or relay terminal | A link between a transmitting terminal and a relay terminal | Preset time which is a comparison reference for a time during which data is not received |

SL RLF configuration information (e.g., RLF configuration information) may include one or more conditions defined in Table 3 and/or one or more information elements (e.g., RLF parameters) defined in Table 4. The base station may use at least one of system information, RRC message, MAC control element (CE), or control information (e.g., downlink control information (DCI)) to transmit the SL RLF configuration information to the communication node(s) (e.g., transmitting terminal, relay terminal, and/or receiving terminal). The communication node(s) may receive the SL RLF configuration information from the base station. When the communication node(s) are located within a coverage of the base station, the SL RLF configuration information may be transmitted through an RRC message.

The SL RLF configuration information may be signaled in various manners. For example, the base station may be configured to generate the SL RLF configuration information including all conditions defined in Table 3 and RLF parameters for all the conditions, and transmit the SL RLF configuration information to the communication node(s) using system information and/or RRC message. The SL RLF configuration information may be common SL RLF configuration information for all of the transmitting terminal, relay terminal, and receiving terminal. After transmitting the above-described SL RLF configuration information, the following operations may be additionally performed. The base station may transmit a MAC CE and/or control information including information indicating available condition(s) among all the conditions to the communication node(s).

Alternatively, the base station may independently generate SL RLF configuration information for each type of communication node (e.g., transmitting terminal, relay terminal, or receiving terminal), and transmit the SL RLF configuration information to each communication node. Here, the SL RLF configuration information may be individual SL RLF configuration information. For example, the SL RLF configuration information for the transmitting terminal may include at least one of information indicating that the condition #2 is to be used, RLF parameters required for the condition #2, information indicating that the condition #3 is to be used, RLF parameters required for the condition #3, information indicating that the condition #4 is to be used, or RLF parameters required for the condition #4.

The SL RLF configuration information for the relay terminal may include at least one of information indicating that the condition #2 is to be used, RLF parameters required for the condition #2, information indicating that the condition #5 is to be used, or RLF parameters for the condition #5. The SL RLF configuration information for the receiving terminal may include at least one of information indicating that the condition #1 is to be used, RLF parameter required for the condition #1, information indicating that the condition #5 is to be used, or RLF parameters for the condition #5.

To support the above-described operation, the communication node may inform the base station of its type (e.g., transmitting terminal, relay terminal, or receiving terminal) in advance. The base station may be configured to generate the SL RLF configuration information (e.g., individual SL RLF configuration information) according to the type indicated by the communication node, and may transmit the SL RLF configuration information to the communication node. The RLF parameters defined in Table 4 (e.g., preset time, preset number of times, and threshold value) may be independently configured for each of the communication nodes.

The communication node(s) may declare (or detect) an RLF based on the SL RLF configuration information and may perform an RLF recovery procedure. An RLF declaration method and/or an RLF recovery method may be performed as follows.

Figure 7:
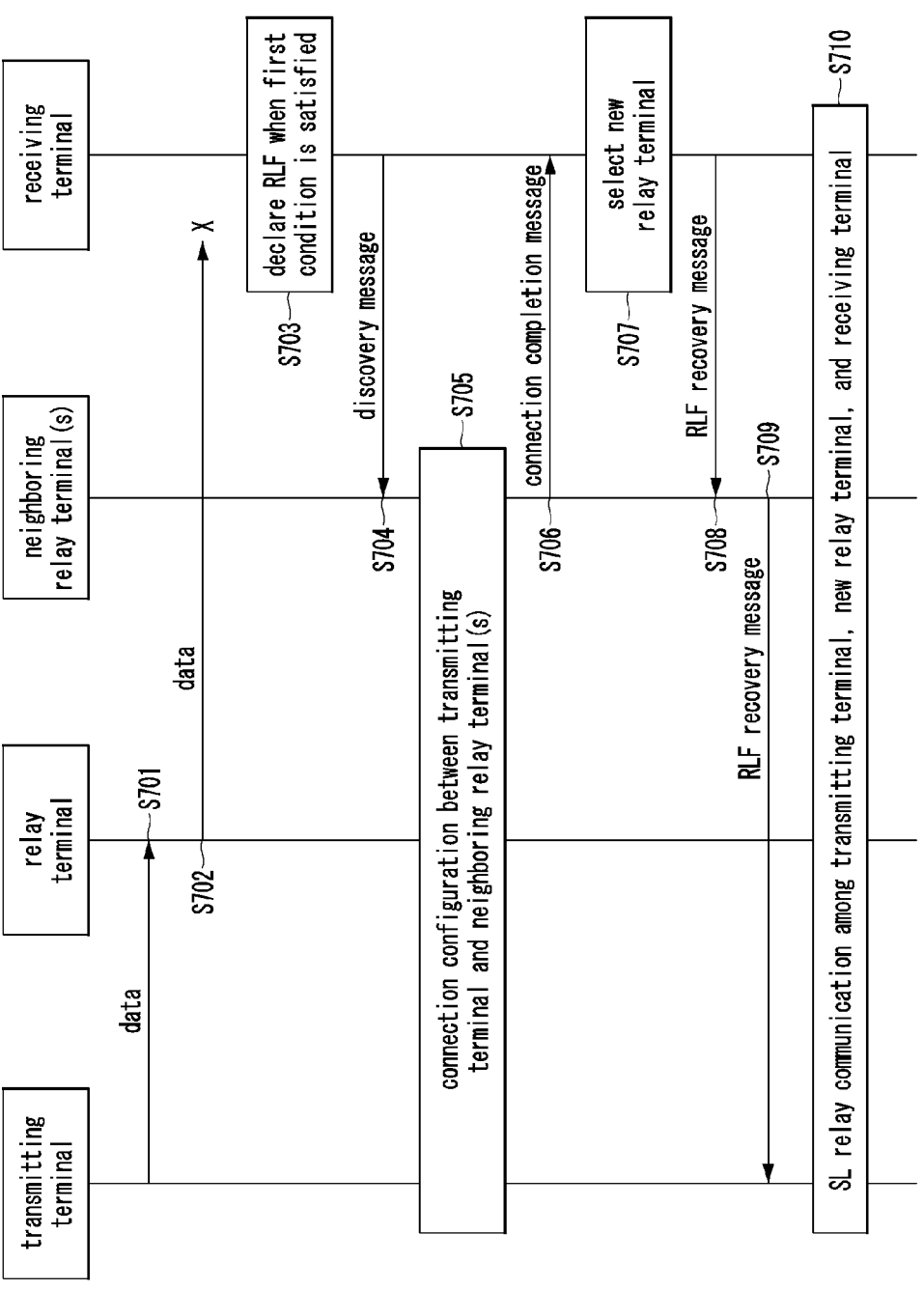
FIG. 7 is a sequence chart illustrating a first exemplary embodiment of an RLF declaration and recovery method when the condition #1 is used.

RLF declaration method and/or RLF recovery method when the condition #1 (i.e., first condition) is used FIG. 7 is a sequence chart illustrating a first exemplary embodiment of an RLF declaration and recovery method when the condition #1 is used.

As shown in FIG. 7, a communication system may include a transmitting terminal, a receiving terminal, a relay terminal, and neighboring relay terminal(s). Each of the transmitting terminal, the receiving terminal, the relay terminal, and the neighboring relay terminal(s) may be configured identically or similarly to the communication node 300 shown in FIG. 3. The transmitting terminal, the receiving terminal, the relay terminal, and the neighboring relay terminal(s) may support the protocol stack(s) shown in FIG. 4, FIG. 5 and FIG. 6. The transmitting terminal may be a terminal transmitting data (e.g., sidelink data), and the receiving terminal may be a terminal receiving the data (e.g., sidelink data). The relay terminal may be a terminal that relays sidelink communication between the transmitting terminal and the receiving terminal.

A connection (e.g., unicast link) between the transmitting terminal and the relay terminal may be configured, and sidelink communication between the transmitting terminal and the relay terminal may be performed in a unicast scheme. A connection (e.g., unicast link) between the receiving terminal and the relay terminal may be configured, and sidelink communication between the receiving terminal and the relay terminal may be performed in a unicast scheme. The transmitting terminal, the relay terminal, and the receiving terminal may be in a state of receiving the above-described SL RLF configuration information from the base station.

The transmitting terminal may transmit data to the receiving terminal through the relay terminal (S701). The data may be periodic data. For example, the transmitting terminal may periodically transmit data to the relay terminal using resources configured by a configured grant (CG). The relay terminal may receive the data from the transmitting terminal. The relay terminal may transmit the data of the transmitting terminal to the receiving terminal (S702). In the step S702, the data may be transmitted periodically in the resources configured by the CG. Alternatively, when a link quality between the transmitting terminal and the relay terminal is poor, the relay terminal may not be able to receive the data from the transmitting terminal, and thus may not perform the step S702.

The receiving terminal may perform a data reception operation. When data is transmitted in the CG scheme, the receiving terminal may perform the data reception operation according to a periodicity configured by the CG. When the link quality between the transmitting terminal and the relay terminal is poor and/or when a link quality between the receiving terminal and the relay terminal is poor, the receiving terminal may not be able to receive data from the relay terminal. As a distance between the transmitting terminal and the relay terminal increases, the link quality between the transmitting terminal and the relay terminal may deteriorate. As a distance between the receiving terminal and the relay terminal increases, the link quality between the receiving terminal and the relay terminal may deteriorate. When data is not received from the relay terminal within a preset time, the receiving terminal may be configured to determine that the condition #1 (e.g., condition #1 defined in Table 3) is satisfied. When the condition #1 is satisfied, the receiving terminal may declare an RLF (e.g., SL RLF) (S703). The condition #1 may mean the first condition. The preset time may be set by the base station. For example, the preset time may be included in the SL RLF configuration information. The preset time may be a multiple of the periodicity configured by the CG.

After declaring the RLF, the receiving terminal may perform a connection procedure with a new relay terminal. For example, the receiving terminal may transmit a discovery message (e.g., discovery signal) to discover neighboring relay terminal(s) (S704). For example, the discovery message may include an identifier of the receiving terminal, an identifier of the transmitting terminal, and/or information requesting connection configuration for SL relay communication. The discovery message may be transmitted in a broadcast scheme. The base station may preconfigure the communication node(s) so that the communication node(s) transmit discovery message(s) when an RLF is declared. Information indicating that the discovery message transmission operation is enabled when an RLF is declared may be included in the above-described SL RLF configuration information. The discovery message may be used to configure a temporary connection for RLF recovery. It may be indicated by the base station that the discovery message is used to configure a temporary connection for RLF recovery.

The neighboring relay terminal(s) may receive the discovery message from the receiving terminal, and identify information elements included in the discovery message. The neighboring relay terminal(s) may configure connection(s) (e.g., PC5 connection, PC5-S connection) with the transmitting terminal indicated by the discovery message (S705). In the step S705, connection(s) between the transmitting terminal and one or more neighboring relay terminals may be configured. The neighboring relay terminal(s) connected to the transmitting terminal may transmit connection completion message(s) to the receiving terminal (e.g., the receiving terminal indicated by the discovery message) (S706). The connection completion message may indicate that connection configuration between the transmitting terminal and the neighboring relay terminal has been completed. Furthermore, the connection completion message may include an identifier of the neighboring relay terminal connected to the transmitting terminal.

The receiving terminal may receive the connection completion message(s) from the neighboring relay terminal(s), and may identify information elements (e.g., identifier(s) of the neighboring relay terminal(s)) included in the connection completion message(s). That is, the receiving terminal may identify the neighboring relay terminal(s) connected to the transmitting terminal. The receiving terminal may select one neighboring relay terminal (e.g., optimal neighboring relay terminal) from among the neighboring relay terminal(s) connected to the transmitting terminal (S707). That is, the one neighboring relay terminal may be determined as a new relay terminal. The receiving terminal may configure a connection with the new relay terminal. The receiving terminal may transmit a message requesting disconnection with the transmitting terminal (hereinafter, referred to as 'connection release request message') to neighboring relay terminal(s) other than the new relay terminal among the neighboring relay terminal(s). When the connection release request message is received from the receiving terminal, the remaining neighbor relay terminal(s) may release connection(s) with the transmitting terminal.

The receiving terminal may transmit an RLF recovery message to the transmitting terminal through the new relay terminal (e.g., selected neighboring relay terminal) (S708). The RLF recovery message may include the identifier of the new relay terminal and/or information indicating that RLF recovery is attempted through the new relay terminal. The RLF recovery message may be an RRC message (e.g., RRC ReconfigurationSidelink message). The new relay terminal may receive the RLF recovery message from the receiving terminal. The new relay terminal may transmit an RLF recovery message to the transmitting terminal (S709). The transmitting terminal may receive the RLF recovery message from the new relay terminal and may identify information elements included in the RLF recovery message. The transmitting terminal may be configured to determine that SL relay communication is to be performed through the new relay terminal based on the RLF recovery message. In the instant case, the transmitting terminal may release connection configuration with the existing relay terminal. Thereafter, SL relay communication among the transmitting terminal, new relay terminal, and receiving terminal may be performed (S710).

Figure 8A:
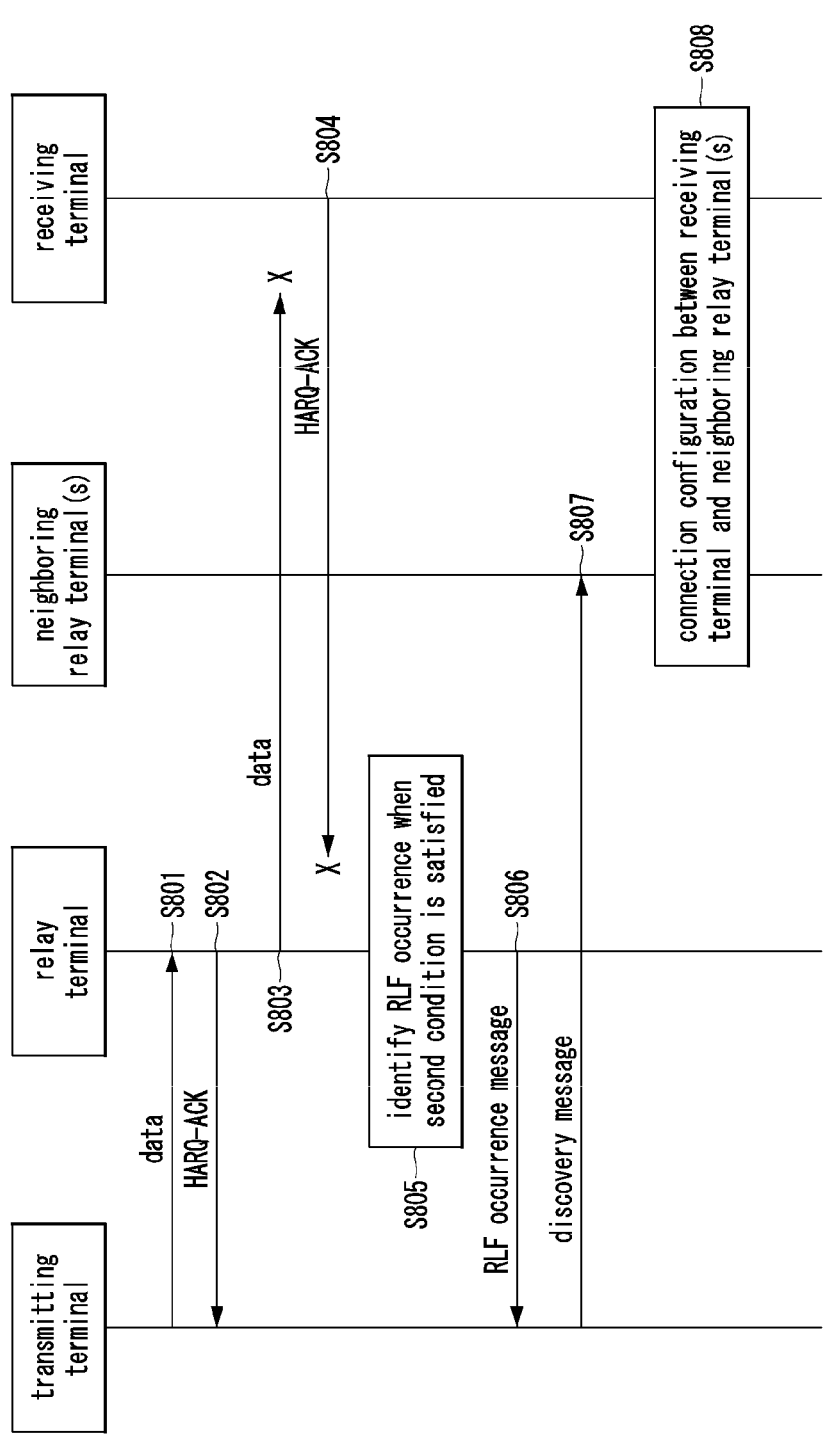
FIG. 8A and FIG. 8B are a sequence chart illustrating a first exemplary embodiment of an RLF declaration and recovery method when the condition #2 is used.
Figure 8B:
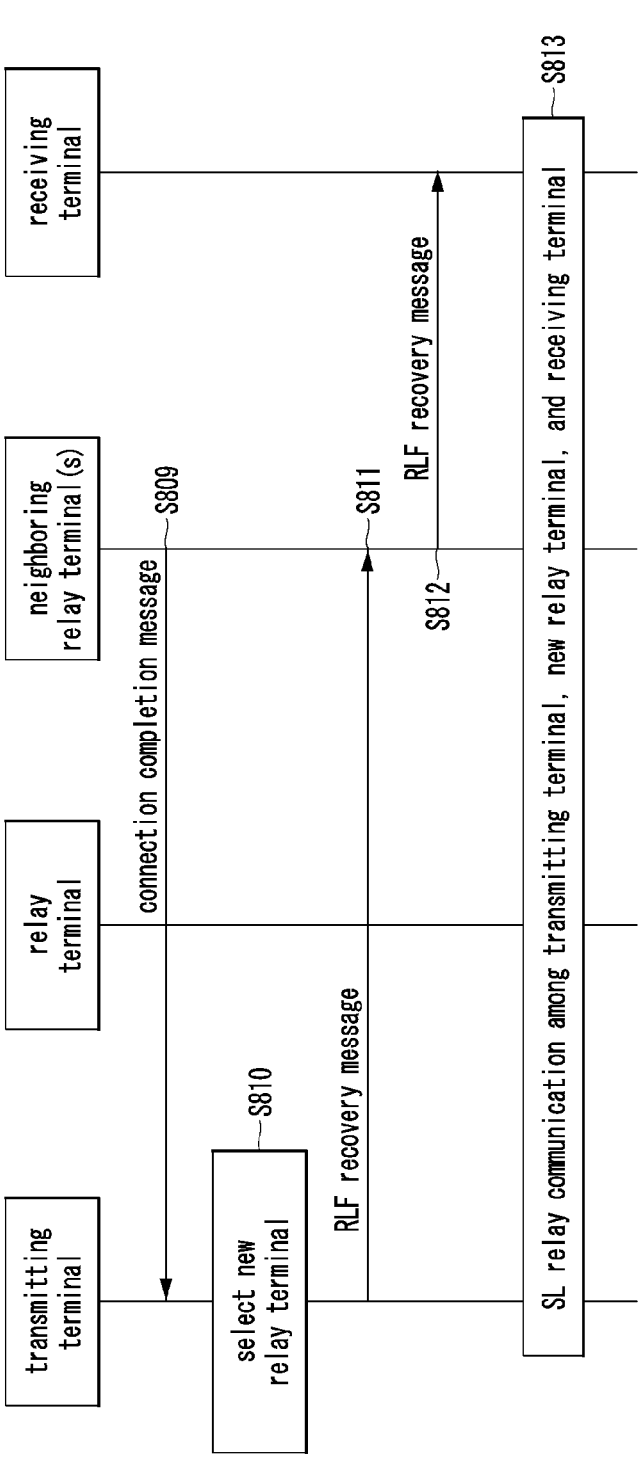

RLF declaration method and/or RLF recovery method when the condition #2 (i.e., second condition) is used FIG. 8A and FIG. 8B are a sequence chart illustrating a first exemplary embodiment of an RLF declaration and recovery method when the condition #2 is used.

As shown in FIGS. 8A and 8B, a communication system may include a transmitting terminal, a receiving terminal, a relay terminal, and neighboring relay terminal(s). Each of the transmitting terminal, the receiving terminal, the relay terminal, and the neighboring relay terminal(s) may be configured identically or similarly to the communication node 300 shown in FIG. 3. The transmitting terminal, the receiving terminal, the relay terminal, and the neighboring relay terminal(s) may support the protocol stack(s) shown in FIG. 4, FIG. 5 and FIG. 6. The transmitting terminal may be a terminal transmitting data (e.g., sidelink data), and the receiving terminal may be a terminal receiving the data (e.g., sidelink data). The relay terminal may be a terminal that relays sidelink communication between the transmitting terminal and the receiving terminal.

A connection (e.g., unicast link) between the transmitting terminal and the relay terminal may be configured, and sidelink communication between the transmitting terminal and the relay terminal may be performed in a unicast scheme. A connection (e.g., unicast link) between the receiving terminal and the relay terminal may be configured, and sidelink communication between the receiving terminal and the relay terminal may be performed in a unicast scheme. The transmitting terminal, the relay terminal, and the receiving terminal may be in a state of receiving the above-described SL RLF configuration information from the base station.

The transmitting terminal may transmit data to the receiving terminal through the relay terminal (S801). The relay terminal may receive the data from the transmitting terminal and may transmit a hybrid automatic repeat request (HARQ)-ACK for the data to the transmitting terminal (S802). The HARQ-ACK may be acknowledgment (ACK) or negative ACK (NACK). The step S802 may be omitted. The relay terminal may transmit the data of the transmitting terminal to the receiving terminal (S803). When a link quality between the relay terminal and the receiving terminal is poor, the receiving terminal may not receive the data from the relay terminal and thus may not be able to transmit HARQ-ACK for the data to the relay terminal. Alternatively, the receiving terminal may receive the data from the relay terminal and may transmit the HARQ-ACK for the data to the relay terminal (S804). When the link quality between the relay terminal and the receiving terminal is poor, the relay terminal may not be able to receive the HARQ-ACK from the receiving terminal.

When the number of reception failures of the HARQ-ACK (e.g., the number of DTX occurrences) for the data transmitted to the receiving terminal is greater than or equal to a preset number of times, the relay terminal may be configured to determine that the condition #2 (e.g., condition #2 defined in Table 3) is satisfied, and accordingly, it may identify that an RLF has occurred (S805). The condition #2 may mean the second condition. The number of reception failures may be the number of consecutive HARQ-ACK reception failures, and the number of DTX occurrences may be the number of consecutive DTX occurrences. The preset number of times may be preset by the base station. The preset number of times may be included in the SL RLF configuration information.

When it is identified that an RLF has occurred, the relay terminal may transmit an RLF occurrence message to the transmitting terminal (S806). The RLF occurrence message may be an RRC message (e.g., RRCReconfigurationSidelink message). The RLF occurrence message may include information indicating that an RLF has occurred and/or information on a link (e.g., sidelink) where the RLF has occurred. The information on the link where the RLF has occurred may include identifiers of communication nodes that have configured the corresponding link. The transmitting terminal may receive the RLF occurrence message from the relay terminal, and may identify that the RLF has occurred in the link between the receiving terminal and the relay terminal based on the information element(s) included in the RLF occurrence message. Here, the RLF may be declared in the transmitting terminal and/or the relay terminal.

When the RLF has occurred, the transmitting terminal may perform a connection procedure with a new relay terminal. For example, the transmitting terminal may transmit a discovery message (e.g., discovery signal) to discover neighboring relay terminal(s) (S807). For example, the discovery message may include an identifier of the receiving terminal, an identifier of the transmitting terminal, and/or information requesting connection configuration for SL relay communication. The discovery message may be transmitted in a broadcast scheme. The base station may preconfigure the communication node(s) to transmit discovery message(s) when an RLF is declared. Information indicating that a discovery message transmission operation is enabled when an RLF is declared may be included in the above-described SL RLF configuration information. The discovery message may be used to configure a temporary connection for RLF recovery. It may be indicated by the base station that the discovery message is used to configure a temporary connection for RLF recovery.

The neighboring relay terminal(s) may receive the discovery message from the transmitting terminal, and identify information elements included in the discovery message. The neighboring relay terminal(s) may configure connection(s) (e.g., PC5 connection, PC5-S connection) with the receiving terminal indicated by the discovery message (S808). In the step S808, connection(s) between the receiving terminal and one or more neighboring relay terminals may be configured. The neighboring relay terminal(s) connected to the receiving terminal may transmit connection completion message(s) to the transmitting terminal (e.g., the transmitting terminal indicated by the discovery message) (S809). The connection completion message may indicate that connection configuration between the receiving terminal and the neighboring relay terminal has been completed. Furthermore, the connection completion message may include an identifier of the neighboring relay terminal connected to the receiving terminal.

The transmitting terminal may receive the connection completion message(s) from the neighboring relay terminal(s), and may identify information elements (e.g., identifier(s) of the neighboring relay terminal(s)) included in the connection completion message(s). That is, the transmitting terminal may identify the neighbor relay terminal(s) connected to the receiving terminal. The transmitting terminal may select one neighboring relay terminal (e.g., optimal neighboring relay terminal) from among the neighboring relay terminal(s) connected to the receiving terminal (S810). That is, the one neighboring relay terminal may be determined as a new relay terminal. The transmitting terminal may configure a connection with the new relay terminal. The transmitting terminal may transmit a message requesting disconnection with the receiving terminal (i.e., connection disconnection request message) to neighboring relay terminal(s) other than the new relay terminal among the neighboring relay terminal(s). When the connection release request message is received from the transmitting terminal, the remaining neighbor relay terminal(s) may release connection(s) with the receiving terminal.

The transmitting terminal may transmit an RLF recovery message to the receiving terminal through the new relay terminal (e.g., selected neighboring relay terminal) (S811). The RLF recovery message may include the identifier of the new relay terminal and/or information indicating that RLF recovery is attempted through the new relay terminal. The RLF recovery message may be an RRC message (e.g., RRCReconfigurationSidelink message). The new relay terminal may receive the RLF recovery message from the transmitting terminal. The new relay terminal may transmit an RLF recovery message to the receiving terminal (S812). The receiving terminal may receive the RLF recovery message from the new relay terminal and may identify information elements included in the RLF recovery message. The receiving terminal may be configured to determine that SL relay communication is to be performed through the new relay terminal based on the RLF recovery message. In the instant case, the receiving terminal may release connection configuration with the existing relay terminal. Thereafter, SL relay communication among the transmitting terminal, new relay terminal, and receiving terminal may be performed (S813).

Figure 9A:
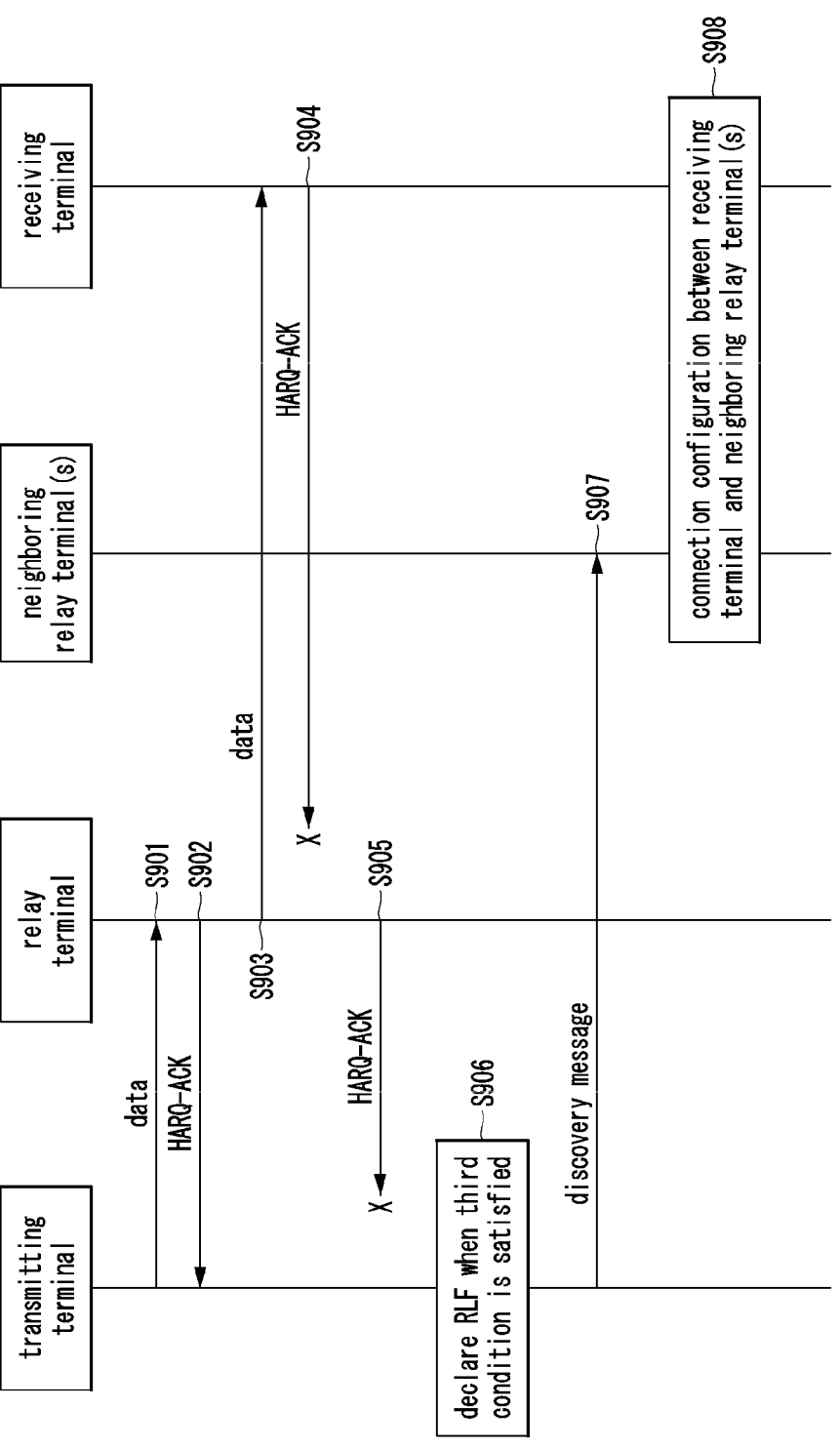
FIG. 9A and FIG. 9B are a sequence chart illustrating a first exemplary embodiment of an RLF declaration and recovery method when the condition #3 is used.
Figure 9B:
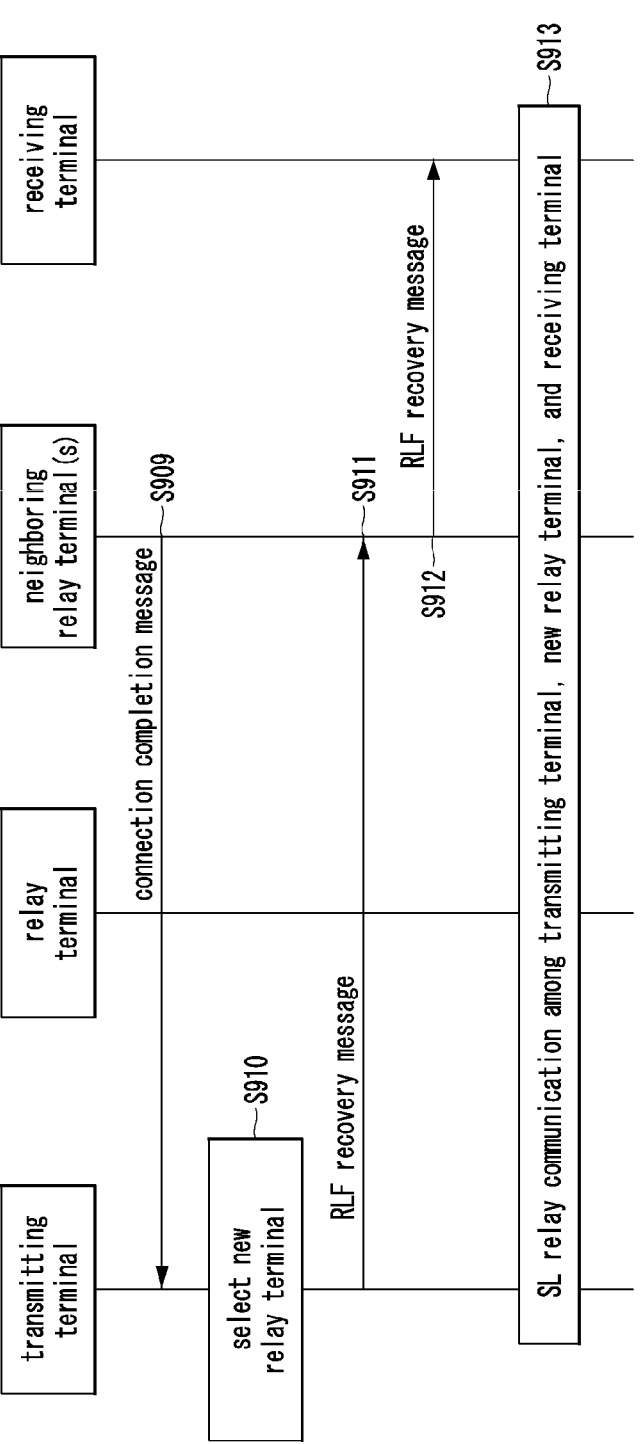

RLF declaration method and/or RLF recovery method when the condition #3 (i.e., third condition) is used FIG. 9A and FIG. 9B are a sequence chart illustrating a first exemplary embodiment of an RLF declaration and recovery method when the condition #3 is used.

As shown in FIG. 9A and FIG. 9B, a communication system may include a transmitting terminal, a receiving terminal, a relay terminal, and neighboring relay terminal(s). Each of the transmitting terminal, the receiving terminal, the relay terminal, and the neighboring relay terminal(s) may be configured identically or similarly to the communication node 300 shown in FIG. 3. The transmitting terminal, the receiving terminal, the relay terminal, and the neighboring relay terminal(s) may support the protocol stack(s) shown in FIG. 4, FIG. 5 and FIG. 6. The transmitting terminal may be a terminal transmitting data (e.g., sidelink data), and the receiving terminal may be a terminal receiving the data (e.g., sidelink data). The relay terminal may be a terminal that relays sidelink communication between the transmitting terminal and the receiving terminal.

A connection (e.g., unicast link) between the transmitting terminal and the relay terminal may be configured, and sidelink communication between the transmitting terminal and the relay terminal may be performed in a unicast scheme. A connection (e.g., unicast link) between the receiving terminal and the relay terminal may be configured, and sidelink communication between the receiving terminal and the relay terminal may be performed in a unicast scheme. The transmitting terminal, the relay terminal, and the receiving terminal may be in a state of receiving the above-described SL RLF configuration information from the base station.

The transmitting terminal may transmit data to the receiving terminal through the relay terminal (S901). The relay terminal may receive the data from the transmitting terminal and may transmit an HARQ-ACK for the data to the transmitting terminal (S902). The HARQ-ACK may be ACK or NACK. The step S902 may be omitted. The relay terminal may transmit the data of the transmitting terminal to the receiving terminal (S903). The receiving terminal may receive the data from the relay terminal and may transmit an HARQ-ACK for the data to the relay terminal (S904). When a link quality between the relay terminal and the receiving terminal is poor, the receiving terminal may not receive the data from the relay terminal. Accordingly, the relay terminal may not be able to transmit the HARQ-ACK of the receiving terminal the transmitting terminal. That is, the transmitting terminal may not be able to receive the HARQ-ACK of the receiving terminal from the relay terminal. Alternatively, the relay terminal may receive the HARQ-ACK from the receiving terminal, and may transmit the HARQ-ACK of the receiving terminal to the transmitting terminal (S905). However, when a link quality between the transmitting terminal and the relay terminal is poor, the transmitting terminal may not be able to receive the HARQ-ACK of the receiving terminal from the relay terminal.

When the number of reception failures of the HARQ-ACK (e.g., the number of DTX occurrences) is greater than or equal to a preset number of times, the transmitting terminal may be configured to determine that the condition #3 (e.g., condition #3 defined in Table 3) is satisfied, and accordingly, it may declare an RLF (S906). The condition #3 may mean the third condition. The number of reception failures may be the number of consecutive HARQ-ACK reception failures, and the number of DTX occurrences may be the number of consecutive DTX occurrences. The preset number of times may be preset by the base station. The preset number of times may be included in the SL RLF configuration information.

After declaring the RLF, the transmitting terminal may perform a connection procedure with a new relay terminal. For example, the transmitting terminal may transmit a discovery message (e.g., discovery signal) to discover neighboring relay terminal(s) (S907). For example, the discovery message may include an identifier of the receiving terminal, an identifier of the transmitting terminal, and/or information requesting connection configuration for SL relay communication. The discovery message may be transmitted in a broadcast scheme. The base station may preconfigure the communication node(s) to transmit discovery message(s) when an RLF is declared. Information indicating that the discovery message transmission operation is enabled when an RLF is declared may be included in the above-described SL RLF configuration information. The discovery message may be used to configure a temporary connection for RLF recovery. It may be indicated by the base station that the discovery message is used to configure a temporary connection for RLF recovery.

The neighboring relay terminal(s) may receive the discovery message from the transmitting terminal, and identify information elements included in the discovery message. The neighboring relay terminal(s) may configure connection(s) (e.g., PC5 connection, PC5-S connection) with the receiving terminal indicated by the discovery message (S908). In the step S908, connection(s) between the receiving terminal and one or more neighboring relay terminals may be configured. The neighboring relay terminal(s) connected to the receiving terminal may transmit connection completion message(s) to the transmitting terminal (e.g., the transmitting terminal indicated by the discovery message) (S909). The connection completion message may indicate that connection configuration between the receiving terminal and the neighboring relay terminal has been completed. Furthermore, the connection completion message may include an identifier of the neighboring relay terminal connected to the receiving terminal.

The transmitting terminal may receive the connection completion message(s) from the neighboring relay terminal(s), and may identify information elements (e.g., identifier(s) of the neighboring relay terminal(s)) included in the connection completion message(s). That is, the transmitting terminal may identify the neighbor relay terminal(s) connected to the receiving terminal. The transmitting terminal may select one neighboring relay terminal (e.g., optimal neighboring relay terminal) from among the neighboring relay terminal(s) connected to the receiving terminal (S910). That is, the one neighboring relay terminal may be determined as a new relay terminal. The transmitting terminal may configure a connection with the new relay terminal. The transmitting terminal may transmit a message requesting disconnection with the receiving terminal (i.e., connection disconnection request message) to neighboring relay terminal(s) other than the new relay terminal among the neighboring relay terminal(s). When the connection release request message is received from the transmitting terminal, the remaining neighbor relay terminal(s) may release connection(s) with the receiving terminal.

The transmitting terminal may transmit an RLF recovery message to the receiving terminal through the new relay terminal (e.g., selected neighboring relay terminal) (S911). The RLF recovery message may include an identifier of the new relay terminal and/or information indicating that RLF recovery is attempted through the new relay terminal. The RLF recovery message may be an RRC message (e.g., RRCReconfigurationSidelink message). The new relay terminal may receive the RLF recovery message from the transmitting terminal. The new relay terminal may transmit an RLF recovery message to the receiving terminal (S912). The receiving terminal may receive the RLF recovery message from the new relay terminal and may identify information elements included in the RLF recovery message. The receiving terminal may be configured to determine that SL relay communication is to be performed through the new relay terminal based on the RLF recovery message. In the instant case, the receiving terminal may release connection configuration with the existing relay terminal. Thereafter, SL relay communication among the transmitting terminal, new relay terminal, and receiving terminal may be performed (S913).

Figure 10:
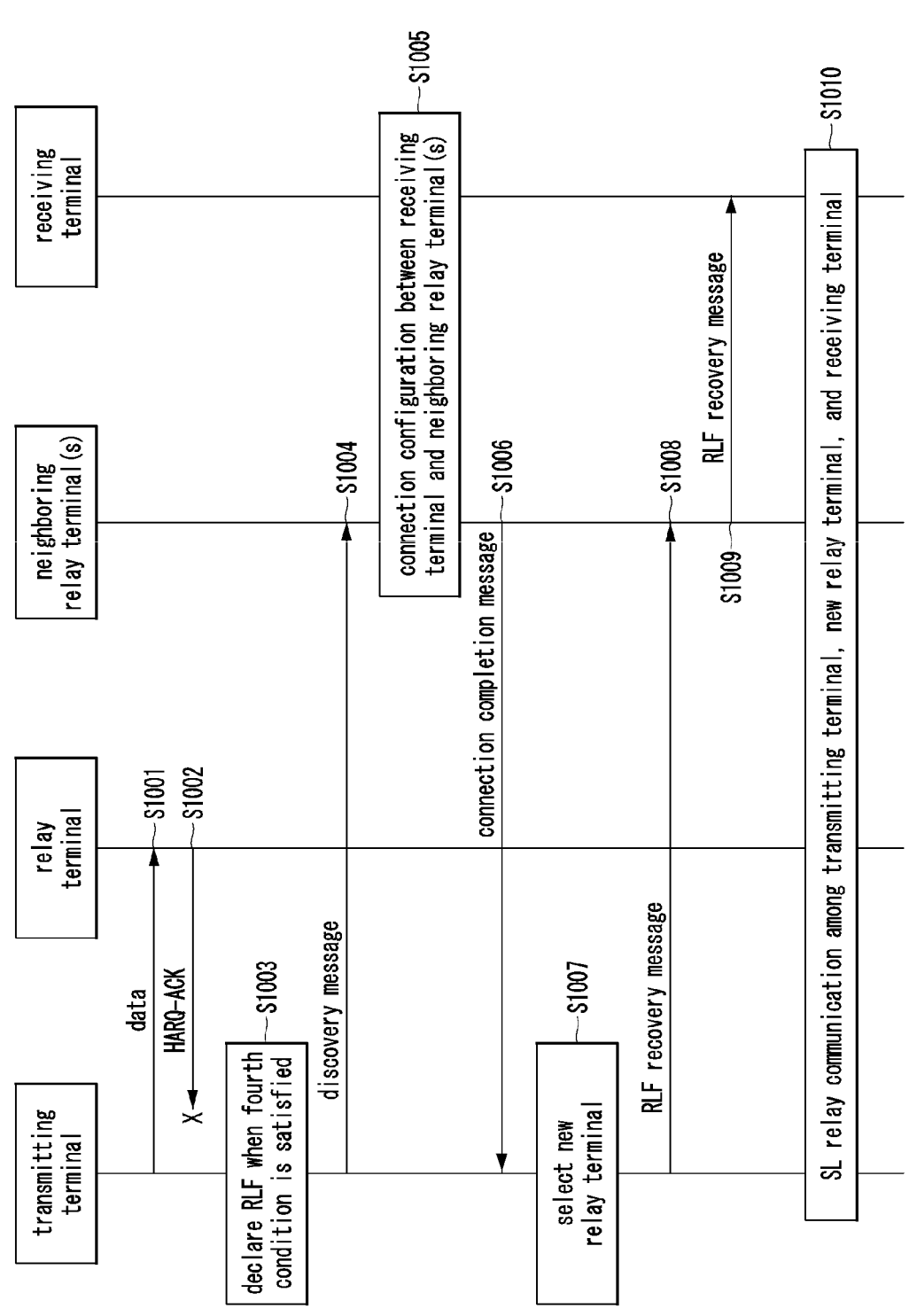
FIG. 10 is a sequence chart illustrating a first exemplary embodiment of an RLF declaration and recovery method when the condition #4 is used.

RLF declaration method and/or RLF recovery method when the condition #4 (i.e., fourth condition) is used FIG. 10 is a sequence chart illustrating a first exemplary embodiment of an RLF declaration and recovery method when the condition #4 is used.

As shown in FIG. 10, a communication system may include a transmitting terminal, a receiving terminal, a relay terminal, and neighboring relay terminal(s). Each of the transmitting terminal, the receiving terminal, the relay terminal, and the neighboring relay terminal(s) may be configured identically or similarly to the communication node 300 shown in FIG. 3. The transmitting terminal, the receiving terminal, the relay terminal, and the neighboring relay terminal(s) may support the protocol stack(s) shown in FIG. 4, FIG. 5 and FIG. 6. The transmitting terminal may be a terminal transmitting data (e.g., sidelink data), and the receiving terminal may be a terminal receiving the data (e.g., sidelink data). The relay terminal may be a terminal that relays sidelink communication between the transmitting terminal and the receiving terminal.

A connection (e.g., unicast link) between the transmitting terminal and the relay terminal may be configured, and sidelink communication between the transmitting terminal and the relay terminal may be performed in a unicast scheme. A connection (e.g., unicast link) between the receiving terminal and the relay terminal may be configured, and sidelink communication between the receiving terminal and the relay terminal may be performed in a unicast scheme. The transmitting terminal, the relay terminal, and the receiving terminal may be in a state of receiving the above-described SL RLF configuration information from the base station.

The transmitting terminal may transmit data to the receiving terminal through the relay terminal (S1001). The relay terminal may receive the data from the transmitting terminal and may transmit an HARQ-ACK for the data to the transmitting terminal (S1002). When a link quality between the transmitting terminal and the relay terminal is poor, the transmitting terminal may not be able to receive the HARQ-ACK from the relay terminal. When the number of reception failures of the HARQ-ACK (e.g., the number of DTX occurrences) is greater than or equal to a preset number of times, the transmitting terminal may be configured to determine that the condition #4 (e.g., condition #4 defined in Table 3) is satisfied, and accordingly, it may declare an RLF (S1003). The condition #4 may mean the fourth condition. The number of reception failures may be the number of consecutive HARQ-ACK reception failures, and the number of DTX occurrences may be the number of consecutive DTX occurrences. The preset number of times may be preset by the base station. The preset number of times may be included in the SL RLF configuration information.

After declaring the RLF, the transmitting terminal may perform a connection procedure with a new relay terminal. For example, the transmitting terminal may transmit a discovery message (e.g., discovery signal) to discover neighboring relay terminal(s) (S1004). For example, the discovery message may include an identifier of the receiving terminal, an identifier of the transmitting terminal, and/or information requesting connection configuration for SL relay communication. The discovery message may be transmitted in a broadcast scheme. The base station may preconfigure the communication node(s) so that the communication node(s) transmit discovery message(s) when an RLF is declared. Information indicating that the discovery message transmission operation is enabled when an RLF is declared may be included in the above-described SL RLF configuration information. The discovery message may be used to configure a temporary connection for RLF recovery. It may be indicated by the base station that the discovery message is used to configure a temporary connection for RLF recovery.

The neighboring relay terminal(s) may receive the discovery message from the transmitting terminal, and identify information elements included in the discovery message. The neighboring relay terminal(s) may configure connection(s) (e.g., PC5 connection, PC5-S connection) with the receiving terminal indicated by the discovery message (S1005). In the step S1005, connection(s) between the receiving terminal and one or more neighboring relay terminals may be configured. The neighboring relay terminal(s) connected to the receiving terminal may transmit connection completion message(s) to the transmitting terminal (e.g., the transmitting terminal indicated by the discovery message) (S1006). The connection completion message may indicate that connection configuration between the receiving terminal and the neighboring relay terminal has been completed. Furthermore, the connection completion message may include an identifier of the neighboring relay terminal connected to the receiving terminal.

The transmitting terminal may receive the connection completion message(s) from the neighboring relay terminal(s), and may identify information elements (e.g., identifier(s) of the neighboring relay terminal(s)) included in the connection completion message(s). That is, the transmitting terminal may identify the neighboring relay terminal(s) connected to the receiving terminal. The transmitting terminal may select one neighboring relay terminal (e.g., optimal neighboring relay terminal) from among the neighboring relay terminal(s) connected to the receiving terminal (S1007). That is, the one neighboring relay terminal may be determined as a new relay terminal. The transmitting terminal may configure a connection with the new relay terminal. The transmitting terminal may transmit a message requesting disconnection with the receiving terminal (hereinafter, referred to as 'connection release request message') to neighboring relay terminal(s) other than the new relay terminal among the neighboring relay terminal(s). When the connection release request message is received from the transmitting terminal, the remaining neighbor relay terminal(s) may release connection(s) with the receiving terminal.

The transmitting terminal may transmit an RLF recovery message to the receiving terminal through the new relay terminal (e.g., selected neighboring relay terminal) (S1008). The RLF recovery message may include an identifier of the new relay terminal and/or information indicating that RLF recovery is attempted through the new relay terminal. The RLF recovery message may be an RRC message (e.g., RRCReconfigurationSidelink message). The new relay terminal may receive the RLF recovery message from the transmitting terminal. The new relay terminal may transmit an RLF recovery message to the receiving terminal (S1009). The receiving terminal may receive the RLF recovery message from the new relay terminal and may identify information elements included in the RLF recovery message. The receiving terminal may be configured to determine that SL relay communication is to be performed through the new relay terminal based on the RLF recovery message. In the instant case, the receiving terminal may release connection configuration with the existing relay terminal. Thereafter, SL relay communication among the transmitting terminal, new relay terminal, and receiving terminal may be performed (S1010).

Figure 11:
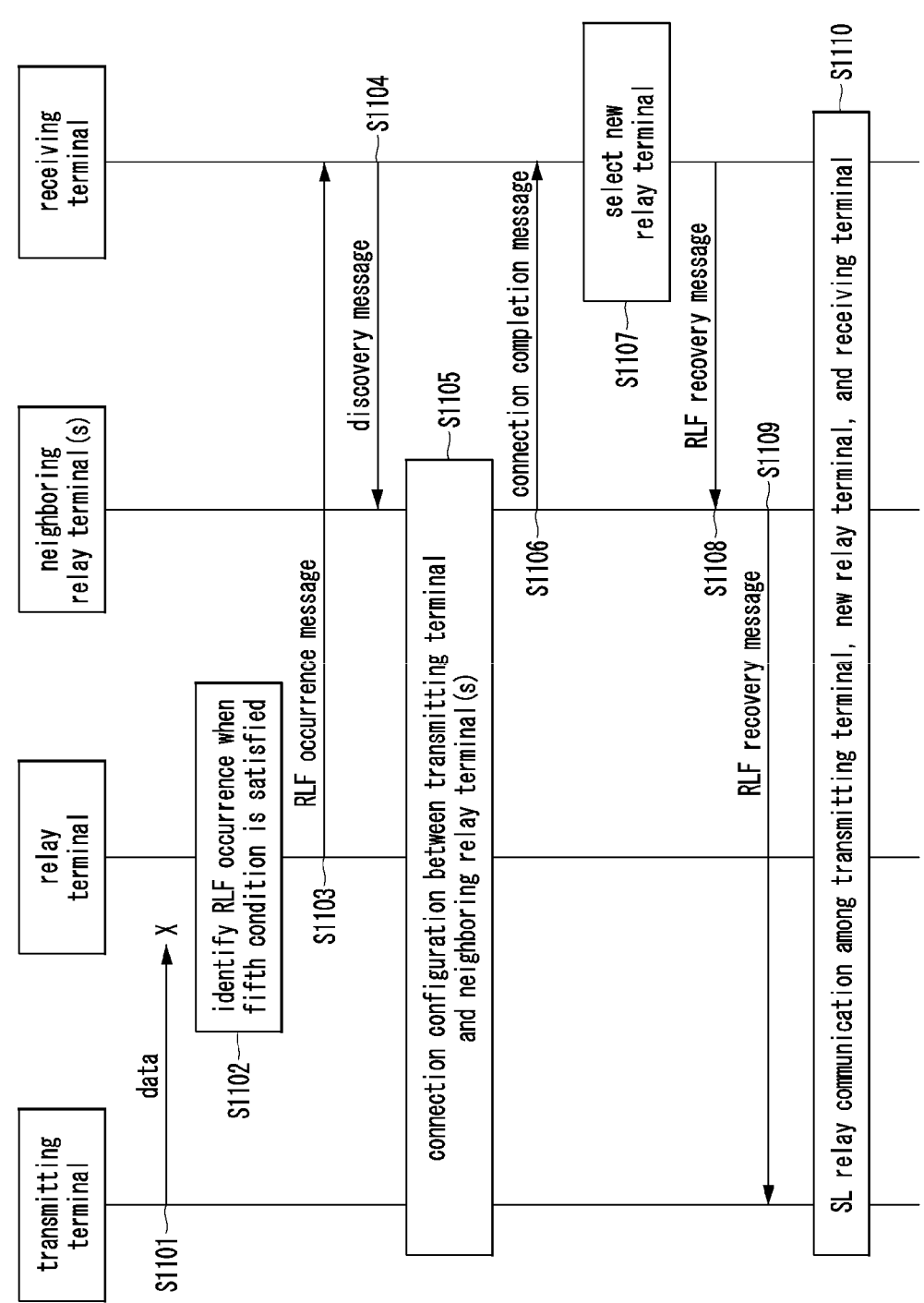
FIG. 11 is a sequence chart illustrating a first exemplary embodiment of an RLF declaration and recovery method when the condition #5 is used.

RLF declaration method and/or RLF recovery method when the condition #5 (i.e., fifth condition) is used FIG. 11 is a sequence chart illustrating a first exemplary embodiment of an RLF declaration and recovery method when the condition #5 is used.

As shown in FIG. 11, a communication system may include a transmitting terminal, a receiving terminal, a relay terminal, and neighboring relay terminal(s). Each of the transmitting terminal, the receiving terminal, the relay terminal, and the neighboring relay terminal(s) may be configured identically or similarly to the communication node 300 shown in FIG. 3. The transmitting terminal, the receiving terminal, the relay terminal, and the neighboring relay terminal(s) may support the protocol stack(s) shown in FIG. 4, FIG. 5 and FIG. 6. The transmitting terminal may be a terminal transmitting data (e.g., sidelink data), and the receiving terminal may be a terminal receiving the data (e.g., sidelink data). The relay terminal may be a terminal that relays sidelink communication between the transmitting terminal and the receiving terminal.

A connection (e.g., unicast link) between the transmitting terminal and the relay terminal may be configured, and sidelink communication between the transmitting terminal and the relay terminal may be performed in a unicast scheme. A connection (e.g., unicast link) between the receiving terminal and the relay terminal may be configured, and sidelink communication between the receiving terminal and the relay terminal may be performed in a unicast scheme. The transmitting terminal, the relay terminal, and the receiving terminal may be in a state of receiving the above-described SL RLF configuration information from the base station.

The transmitting terminal may transmit data to the receiving terminal through the relay terminal (S1101). The data may be periodic data. For example, the transmitting terminal may periodically transmit data to the relay terminal using resources configured by a CG. When the data is transmitted in the CG scheme, the relay terminal may perform a data reception operation according to a periodicity configured by the CG. When a link quality between the transmitting terminal and the relay terminal is poor, the relay terminal may not be able to receive the data from the transmitting terminal. When data is not received from the transmitting terminal within a preset time, the relay terminal may be configured to determine that the condition #5 (e.g., condition #5 defined in Table 3) is satisfied, and accordingly, it may identify that an RLF has occurred (S1102). The condition #5 may mean the fifth condition. The preset time may be set by the base station. For example, the preset time may be included in the SL RLF configuration information. The preset time may be a multiple of the periodicity configured by the CG.

When it is identified that an RLF has occurred, the relay terminal may transmit an RLF occurrence message to the receiving terminal (S1103). The RLF occurrence message may be an RRC message (e.g., RRCReconfigurationSidelink message). The RLF occurrence message may include information indicating that an RLF has occurred and/or information on a link (e.g., sidelink) where the RLF has occurred. The information on the link where the RLF has occurred may include identifiers of communication nodes that have configured the corresponding link. The receiving terminal may receive the RLF occurrence message from the relay terminal, and may identify that the RLF has occurred in the link between the transmitting terminal and the relay terminal based on the information element(s) included in the RLF occurrence message. Here, the RLF may be declared in the receiving terminal and/or the relay terminal.

When the RLF has occurred, the receiving terminal may perform a connection procedure with a new relay terminal. For example, the receiving terminal may transmit a discovery message (e.g., discovery signal) to discover neighboring relay terminal(s) (S1104). For example, the discovery message may include an identifier of the receiving terminal, an identifier of the transmitting terminal, and/or information requesting connection configuration for SL relay communication. The discovery message may be transmitted in a broadcast scheme. The base station may preconfigure the communication node(s) to transmit discovery message(s) when an RLF is declared. Information indicating that the discovery message transmission operation is enabled when an RLF is declared may be included in the above-described SL RLF configuration information. The discovery message may be used to configure a temporary connection for RLF recovery. It may be indicated by the base station that the discovery message is used to configure a temporary connection for RLF recovery.

The neighboring relay terminal(s) may receive the discovery message from the receiving terminal, and identify information elements included in the discovery message. The neighboring relay terminal(s) may configure connection(s) (e.g., PC5 connection, PC5-S connection) with the transmitting terminal indicated by the discovery message (S1105). In the step S1105, connection(s) between the transmitting terminal and one or more neighboring relay terminals may be configured. The neighboring relay terminal(s) connected to the transmitting terminal may transmit connection completion message(s) to the receiving terminal (e.g., the receiving terminal indicated by the discovery message) (S1106). The connection completion message may indicate that connection configuration between the transmitting terminal and the neighboring relay terminal has been completed. Furthermore, the connection completion message may include an identifier of the neighboring relay terminal connected to the transmitting terminal.

The receiving terminal may receive the connection completion message(s) from the neighboring relay terminal(s), and may identify information elements (e.g., identifier(s) of the neighboring relay terminal(s)) included in the connection completion message(s). That is, the receiving terminal may identify the neighbor relay terminal(s) connected to the transmitting terminal. The receiving terminal may select one neighboring relay terminal (e.g., optimal neighboring relay terminal) from among the neighboring relay terminal(s) connected to the transmitting terminal (S1107). That is, the one neighboring relay terminal may be determined as a new relay terminal. The receiving terminal may configure a connection with the new relay terminal. The receiving terminal may transmit a message requesting disconnection with the transmitting terminal (i.e., connection disconnection request message) to neighboring relay terminal(s) other than the new relay terminal among the neighboring relay terminal(s). When the connection release request message is received from the receiving terminal, the remaining neighbor relay terminal(s) may release connection(s) with the transmitting terminal.

The receiving terminal may transmit an RLF recovery message to the transmitting terminal through the new relay terminal (e.g., selected neighboring relay terminal) (S1108). The RLF recovery message may include an identifier of the new relay terminal and/or information indicating that RLF recovery is attempted through the new relay terminal. The RLF recovery message may be an RRC message (e.g., RRCReconfigurationSidelink message). The new relay terminal may receive the RLF recovery message from the receiving terminal. The new relay terminal may transmit an RLF recovery message to the transmitting terminal (S1109). The transmitting terminal may receive the RLF recovery message from the new relay terminal and may identify information elements included in the RLF recovery message. The transmitting terminal may be configured to determine that SL relay communication is to be performed through the new relay terminal based on the RLF recovery message. In the instant case, the transmitting terminal may release connection configuration with the existing relay terminal. Thereafter, SL relay communication among the transmitting terminal, new relay terminal, and receiving terminal may be performed (S1110).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured for the present disclosure or may be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a transmitting user equipment (UE), the method comprising:
  performing first sidelink (SL) relay communication with a receiving UE through a first relay UE;
  declaring a radio link failure (RLF) for a sidelink where the first SL relay communication is performed based on a number of reception failures of hybrid automatic repeat request (HARQ)-acknowledgement (ACK) for data transmitted through the first relay UE is greater than or equal to a threshold value;
  configuring a connection with a second relay UE; and
  performing second SL relay communication with the receiving UE through the second relay UE.

2. The method of claim 1, further including receiving, from a base station, a first message including information indicating a preconfigured condition used for declaring the RLF.

3. The method of claim 2, wherein the first message further includes information used to determine whether the preconfigured condition is satisfied.

4. The method of claim 1, wherein a preconfigured condition used for declaring the RLF is independently configured for each UE type, and the UE type indicates a transmitting UE, a relay UE, or a receiving UE.

5. The method of claim 1, wherein the configuring of the connection with the second relay UE includes:
  transmitting a discovery message in a broadcast scheme; and
    configuring a connection with the second relay UE determined based on the discovery message.

6. The method of claim 5, further including transmitting, to the receiving UE, information of the second relay UE connected to the transmitting UE through the second relay UE.

7. A method of a relay user equipment (UE), the method comprising:
  performing sidelink (SL) relay communication between a transmitting UE and a receiving UE;
  determining that a radio link failure (RLF) for a sidelink where first SL relay communication is performed has occurred based on a number of reception failures of hybrid automatic repeat request (HARQ)-acknowledgement (ACK) for data of the transmitting UE transmitted from the relay UE to the receiving UE is greater than or equal to a threshold value; and
  transmitting a second message indicating the occurrence of the RLF.

8. The method of claim 7, further including receiving, from a base station, a first message including information indicating a preconfigured condition used for declaring the RLF, wherein the first message further includes information to be used for determining whether the preconfigured condition is satisfied.

9. The method of claim 7, wherein a preconfigured condition used for declaring the RLF is independently configured for each UE type, and the UE type indicates a transmitting UE, the relay UE, or the receiving UE.

10. The method of claim 7, wherein the second message further includes information of a sidelink in which the RLF has occurred.

* * * * *